United States Patent
Mammen et al.

(10) Patent No.: US 6,946,023 B2
(45) Date of Patent: Sep. 20, 2005

(54) SMEAR-RESISTANT INK COMPOSITIONS

(75) Inventors: Thomas Mammen, La Verne, CA (US); Robert Valadez, Azusa, CA (US)

(73) Assignee: Avery Dennison Corporation, Pasadena, CA (US)

( * ) Notice: Subject to any disclaimer, the term of this patent is extended or adjusted under 35 U.S.C. 154(b) by 44 days.

(21) Appl. No.: 10/165,663

(22) Filed: Jun. 6, 2002

(65) Prior Publication Data

US 2003/0226474 A1 Dec. 11, 2003

(51) Int. Cl.$^7$ .............................................. C09D 11/00
(52) U.S. Cl. ................. 106/31.15; 106/31.32; 106/31.49; 106/31.58; 106/31.43; 106/31.59
(58) Field of Search .................... 106/31.15, 31.32, 106/31.49, 31.58, 31.43, 31.59

(56) References Cited

U.S. PATENT DOCUMENTS

| | | | | |
|---|---|---|---|---|
| 5,028,620 A | * | 7/1991 | Hsu | 514/372 |
| 5,100,905 A | * | 3/1992 | Hsu | 514/372 |
| 5,174,814 A | | 12/1992 | Burwell et al. | |
| 5,498,280 A | * | 3/1996 | Fistner et al. | 106/31.64 |
| 5,865,883 A | * | 2/1999 | Teraoka et al. | 106/31.32 |
| 5,948,155 A | * | 9/1999 | Yui et al. | 106/31.58 |
| 6,347,867 B1 | * | 2/2002 | Lawrence et al. | 347/105 |
| 6,361,916 B1 | * | 3/2002 | Chen et al. | 430/137.14 |
| 6,364,476 B1 | * | 4/2002 | Lawrence et al. | 347/100 |
| 6,454,404 B1 | * | 9/2002 | Lawrence et al. | 347/100 |
| 6,503,608 B2 | * | 1/2003 | Lawrence et al. | 347/105 |
| 6,534,076 B1 | * | 3/2003 | Hahn et al. | 424/405 |
| 2003/0106462 A1 | * | 6/2003 | Yatake et al. | 106/31.59 |

OTHER PUBLICATIONS

A publication, Keystone Aniline Corporation data sheet for Pyranine 10G, no date available.
A publication, Keystone Aniline Corporation data sheet for Fluorescent Yellow coumarin dye, Apr. 14, 1999.
A publication, BASF Basonyl dyes data sheet, Aug. 1987.
A publication, Yorkshire America Intrawite® RW II whitening agent data sheet, Aug. 2000.
A publication, Rite Industries Elacid Acid Blue 9 data sheet, Aug. 29, 2001.
A publication, Rite Industries Elacid Violet 4BS (Ricoamide Violet) data sheet, Sep. 10, 2001.
A publication, Union Carbide diethylene glycol data sheet, 1994, no month available.
A publication, Dow triethanolamine data sheet Sep. 30, 1994.
A publication, J. T. Baker ethylene glycol data sheet, Feb. 25, 1999.
A publication, Air Products Surfynol 104 data sheet, no date available.
A publication, S.C. Johnson Polymer Joncryl 678 data sheet, no date available.
A publication, Rohm & Haas Kathon data sheet, Jan. 6, 2000.
A publication, Solvent Red 49 xanthene dye data sheet, Sep. 2000.
A publication, Arco Chemical Company propylene glycol date sheet, Nov. 1993.
A publication, International Specialty Products 2–pyrol data sheet, Sep. 3, 1997.
A publication, Ashland potassium carbonate data sheet, Jan. 26, 1998.

* cited by examiner

*Primary Examiner*—Mark L. Bell
*Assistant Examiner*—Veronica F. Faison
(74) *Attorney, Agent, or Firm*—Fulwider Patton Lee & Utecht, LLP; Scott R. Hansen

(57) ABSTRACT

In general, a smear-resistant ink composition according to the present invention comprises: (1) water; (2) at least one glycol selected from the group consisting of diethylene glycol, ethylene glycol, glycerol, and propylene glycol; (3) a pyrrolidone selected from the group consisting of 2-pyrrolidone and 3-pyrrolidone; and (4) at least one colorant that produces a detectable fluorescent color when the ink composition is applied to paper. Preferably, the pyrrolidone is 2-pyrrolidone. In one preferred embodiment, the at least one glycol comprises diethylene glycol and ethylene glycol. In another preferred embodiment, the at least one glycol comprises diethylene glycol, ethylene glycol, and propylene glycol. The composition can comprise other ingredients, such as a basic color stabilizer, a resin, a resin modifier that is a carbonate salt, a biocide, and a nonionic surfactant. The colorants can be formulated to produce a pink, yellow, blue, green, purple, or orange color; other colors are possible.

32 Claims, No Drawings

US 6,946,023 B2

SMEAR-RESISTANT INK COMPOSITIONS

BACKGROUND OF THE INVENTION

General Background and State of the Art

This invention is directed to smear-resistant ink compositions, particularly for use in marker pens and other marking devices.

Marker pens and in particular highlighting pens that are used to highlight text or printed material are in common use. The preferred inks employed in highlighting marker pens utilize a fluorescent dye that gives the ink a pleasing glow-like appearance when it is coated on paper. These marking instruments typically have a tip that can be a felt, plastic, or fibrous material such as nylon, acrylic, or polyester fiber. The marking tip is generally larger and wider than tips employed in ballpoint or other pens such as fine tip, fiber, or plastic writing pens. Marker pens typically have tips between about 1/16 to 3/8 inches in width. These marker pens, which are widely available, commonly have a tip that is not retractable. In such cases the pen is fitted with a removable cap which the user must then remove to expose the marker tip. The user replaces the cap over the marker after use to prevent ink from evaporating from the tip.

The inks employed in highlighting marking pens are typically comprised of a dye dissolved in a glycol solvent in water. These ink formulations have the disadvantage that they evaporate quickly from the marker tip; thus, the marker tip begins to dry out within several hours if it is left exposed to the environment without the protection of a tightly fitting cap.

Although inks for use in such marking instruments that resist premature evaporation and drying out are known, and are described, for example, in U.S. Pat. No. 5,174,814 to Burwell et al., incorporated herein by this reference, such inks typically have poor smear resistance, particularly when highlighting documents printed by ink-jet printers. These printers are commonly used by both individuals and businesses. The current market share of ink-jet printers is about 70% to 80%. Once documents printed with ink-jet printers are highlighted with previous highlighting inks, the inks tend to smear and the documents become dark and illegible. The ink in present highlighters is designed only to highlight documents printed by laser printers or reproduced by copiers. Thus, currently-available inks for highlighters are not suitable for use on a large percentage of documents which consumers or businesses handle. There is therefore a need for an improved smear-resistant ink composition for use in highlighters and other marking devices.

INVENTION SUMMARY

In general, a smear-resistant ink composition according to the present invention comprises:

(1) water;
(2) at least one glycol selected from the group consisting of diethylene glycol, ethylene glycol, glycerol, and propylene glycol;
(3) a pyrrolidone selected from the group consisting of 2-pyrrolidone and 3-pyrrolidone; and
(4) at least one colorant that produces a detectable fluorescent color when the ink composition is applied to paper.

A preferred smear-resistant ink composition according to the present invention comprises:

(1) from about 20% to about 50% of water;
(2) from about 20% to about 50% of diethylene glycol;
(3) optionally, from about 0.1% to about 15% of ethylene glycol;
(4) optionally, from about 0.1% to about 15 of propylene glycol;
(5) from about 0.1% to about 20% of 2-pyrrolidone;
(6) optionally, from about 0.1% to about 15% of triethanolamine;
(7) optionally, from about 0.1% to about 10.0% of a resin that is a styrenated acrylic polymer that has a weight-average molecular weight of about 8500;
(8) from about 0.1% to about 5% of colorant to yield a detectable fluorescent color when the ink composition is applied to paper;
(9) from about 0.1% to about 2% of a mixture of 5-chloro-2-methyl-4-isothiazolin-3-one and 2-methyl-4-isothiazolin-3-one;
(10) optionally, from about 0.1% to about 5.0% of potassium carbonate; and
(11) from about 0.1% to about 2% of 2,4,7,9-tetramethyl-5-decyne-4,7-diol.

A particularly preferred composition according to the present invention comprises:

(1) from about 20% to about 40% of water;
(2) from about 20% to about 40% of diethylene glycol;
(3) from about 7% to about 12% of ethylene glycol;
(4) optionally, from about 7% to about 12% of propylene glycol;
(5) from about 5% to about 15% of 2-pyrrolidone;
(6) optionally, from about 5% to about 12% of triethanolamine;
(7) optionally, from about 2% to about 7% of a resin that is a styrenated acrylic polymer that has a weight-average molecular weight of about 8500;
(8) optionally, about 2% to about 5% of potassium carbonate; (9) from about 0.1% to about 3% of colorant;
(10) from about 0.1% to about 1% of a mixture of 5-chloro-2-methyl-4-isothiazolin-3-one and 2-methyl-4-isothiazolin-3-one; and
(11) from about 0.1% to about 1% of 2,4,7,9-tetramethyl-5-decyne-4,7-diol.

A preferred composition that produces a fluorescent yellow color comprises:

(1) from about 28.80% to about 35.20% of water;
(2) from about 34.20% to about 41.80% of diethylene glycol;
(3) from about 7.20% to about 8.80% of triethanolamine;
(4) from about 9.00% to about 11.00% of ethylene glycol;
(5) from about 9.00% to about 11.00% of 2-pyrrolidone;
(6) from about 1.62% to about 1.98% of a pyrene dye that produces a detectable fluorescent yellow color when the ink composition is applied to paper;
(7) from about 0.09% to about 0.11% of a mixture of 5-chloro-2-methyl-4-isothiazolin-3-one and 2-methyl-4-isothiazolin-3-one; and
(8) from about 0.09% to about 0.11% of 2,4,7,9-tetramethyl-5-decyne-4,7-diol.

A preferred composition that produces a fluorescent pink composition comprises:

(1) about 34.20% to about 41.80% of water;
(2) about 22.14% to about 27.06% of diethylene glycol;

(3) about 9.00% to about 11.00% of ethylene glycol;
(4) about 9.00% to about 11.00% of propylene glycol;
(5) about 9.00% to about 11.00% of 2-pyrrolidone;
(6) about 0.09% to about 0.11% of a mixture of 5-chloro-2-methyl-4-isothiazolin-3-one and 2-methyl-4-isothiazolin-3-one;
(7) about 3.15% to about 3.85% of a resin that is a styrenated acrylic polymer that has a weight-average molecular weight of about 8500;
(8) about 3.15% to about 3.85% of potassium carbonate;
(9) about 0.18% to about 0.22% of a rhodamine dye that produces a detectable fluorescent pink color when the ink composition is applied to paper; and
(10) about 0.09% to about 0.11% of 2,4,7,9-tetramethyl-5-decyne-4,7-diol.

A preferred composition that produces a fluorescent blue color comprises:
(1) from about 31.995% to about 39.105% of water;
(2) from about 28.80% to about 35.20% of diethylene glycol;
(3) from about 9.00% to about 11.00% of ethylene glycol;
(4) from about 9.00% to about 11.00% of propylene glycol;
(5) from about 9.00% to about 11.00% of 2-pyrrolidone;
(6) from about 0.090% to about 0.110% of a mixture of 5-chloro-2-methyl-4-isothiazolin-3-one and 2-methyl-4-isothiazolin-3-one;
(7) from about 0.09% to about 0.11% of 2,4,7,9-tetramethyl-5-decyne-4,7-diol;
(8) from about 1.125% to about 1.375% of a triphenylmethane dye; and
(9) from about 0.90% to about 1.10% of a color brightener that is an anionic stilbene derivative, the triphenylmethane dye and the color brightener producing a detectable fluorescent blue color when the ink composition is applied to paper.

A preferred composition that produces a fluorescent green color comprises:
(1) from about 31.50% to about 38.50% of water;
(2) from about 20.475% to about 25.025% of diethylene glycol;
(3) from about 9.00% to about 11.00% of triethanolamine;
(4) from about 9.00% to about 11.00% of ethylene glycol;
(5) from about 9.00% to about 11.00% of propylene glycol;
(6) from about 9.00% to about 11.00% of 2-pyrrolidone;
(7) from about 1.62% to about 1.98% of a pyrene dye;
(8) from about 0.09% to about 0.11% of a mixture of 5-chloro-2-methyl-4-isothiazolin-3-one and 2-methyl-4-isothiazolin-3-one;
(9) from about 0.09% to about 0.11% of 2,4,7,9-tetramethyl-5-decyne-4,7-diol; and
(10) from about 0.225% to about 0.275% of a triphenylmethane dye, the pyrene dye and the triphenylmethane dye together producing a detectable fluorescent green color when the ink composition is applied to paper.

A preferred composition that produces a fluorescent purple color comprises:
(1) from about 32.022% to about 39.138% of water;
(2) from about 30.60% to about 37.40% of diethylene glycol;
(3) from about 9.00% to about 11.00% of ethylene glycol;
(4) from about 9.00% to about 11.00% of propylene glycol;
(5) from about 9.00% to about 11.00% of 2-pyrrolidone;
(6) from about 0.09% to about 0.11% of a mixture of 5-chloro-2-methyl-4-isothiazolin-3-one and 2-methyl-4-isothiazolin-3-one;
(7) from about 0.054% to about 0.066% of rhodamine dye;
(8) from about 0.09% to about 0.11% of 2,4,7,9-tetramethyl-5-decyne-4,7-diol; and
(9) from about 0.144% to about 0.176% of a triphenylmethane dye, the rhodamine dye and the triphenylmethane dye together producing a detectable fluorescent purple color when the ink composition is applied to paper.

A preferred composition that produces a fluorescent orange color comprises:
(1) from about 32.40% to about 39.60% of water;
(2) from about 29.232% to about 35.728% of diethylene glycol;
(3) from about 9.00% to about 11.00% of ethylene glycol;
(4) from about 9.00% to about 11.00% of propylene glycol;
(5) from about 9.00% to about 11.00% of 2-pyrrolidone;
(6) from about 0.09% to about 0.11% of a mixture of 5-chloro-2-methyl-4-isothiazolin-3-one and 2-methyl-4-isothiazolin-3-one;
(7) from about 0.09% to about 0.11% of 2,4,7,9-tetramethyl-5-decyne-4,7-diol;
(8) from about 0.153% to about 0.187% of xanthene dye; and
(9) from about 1.035% to about 1.265% of a coumarin dye, the xanthene dye and the coumarin dye together producing a detectable fluorescent orange color when the ink composition is applied to paper.

DETAILED DESCRIPTION OF THE PREFERRED EMBODIMENTS

In general, a smear-resistant ink composition according to the present invention comprises:
(1) water;
(2) at least one glycol selected from the group consisting of diethylene glycol, ethylene glycol, glycerol, and propylene glycol;
(3) a pyrrolidone selected from the group consisting of 2-pyrrolidone and 3-pyrrolidone; and
(4) at least one colorant that produces a detectable fluorescent color when the ink composition is applied to paper.

In one preferred embodiment, the at least one glycol comprises diethylene glycol and ethylene glycol.

In another preferred embodiment, the at least one glycol comprises diethylene glycol, ethylene glycol, and propylene glycol.

Preferably, the pyrrolidone is 2-pyrrolidone.

Ink compositions according to the present invention can further comprise other ingredients. For example, the ink composition can further comprise a basic color stabilizer to adjust the pH and keep the pH in a relatively alkaline range in order to ensure that the dyes used retain their color. The basic color stabilizer is typically selected from the group consisting of ethanolamine, diethanolamine, and triethanolamine. Preferably, the basic color stabilizer is triethanolamine. Other amine-containing water-soluble organic bases can alternatively be used as the color stabilizer.

The ink composition can further contain a resin that is soluble in an aqueous alkaline medium. Typically, the resin is a styrenated acrylic polymer that has a weight-average molecular weight of about 5000 to about 10,000. Preferably, the styrenated acrylic polymer has a weight-average molecular weight of about 8500. A suitable resin is Joncryl 678, marketed by S. C. Johnson & Son, Inc., of Racine, Wis.

When the ink composition contains a resin, it can further contain a resin modifier that is a carbonate salt. The resin modifier is typically potassium carbonate or sodium carbonate. Preferably, the resin modifier is potassium carbonate.

The composition can further comprise a biocide to prevent bacterial or mold growth in the composition. A particularly preferred biocide is a mixture of 5-chloro-2-methyl-4-isothiazolin-3-one and 2-methyl-4-isothiazolin-3-one. A suitable mixture of 5-chloro-2-methyl-4-isothiazolin-3-one and 2-methyl-4-isothiazolin-3-one is marketed by Rohm & Haas as Kathon CG-ICP II. Kathon CG-ICP II comprises approximately 1.10 to 1.25 weight % of 5-chloro-2-methyl-4-isothiazolin-3-one, 0.30 to 0.45 weight % of 2-methyl-4-isothiazolin-3-one, 1.0 to 1.2 weight % of magnesium chloride, 1.4 to 2.08 weight % of magnesium nitrate, 0.15 to 0.17 weight % copper nitrate trihydrate, and 95.5 to 96.2 weight % of water.

Other suitable biocides can alternatively be used.

The ink composition can further comprise a nonionic surfactant. Typically, the nonionic surfactant is a branched alkynediol. Preferably, the branched alkynediol is 2,4,7,9-tetramethyl-5-decyne-4,7-diol. A suitable preparation of 2,4,7,9-tetramethyl-5-decyne-4,7-diol is marketed by Air Products as Surfynol 104.

The composition includes one or more colorants as described above. These colorants are typically fluorescent when used in highlighters and similar marking devices. The particular colorants can be chosen to give the desired color; the entire range of colors is possible.

In one preferred embodiment, the colorant is a rhodamine dye that produces a pink color. A suitable rhodamine dye is DS 606-049-50, marketed by TDS. This dye is a xanthene with a color index of Solvent red 49 (45170:1). It is soluble in alcohols and glycols, as well as other relatively polar organic compounds such as ketones, but is relatively insoluble in hydrophobic organic compounds such as toluene. This dye has an absorbance maximum at 564 nanometers.

In another embodiment, the colorant is a pyrene dye that produces a yellow color. A suitable pyrene dye is Pyranine 10, marketed by Keystone Aniline Corp. This dye is relatively soluble in water and propylene glycol. Its color index name is Solvent Green 7 and its color index number is 59040.

In another preferred embodiment, the colorant is a triphenylmethane dye that is used together with a color brightener that is an anionic stilbene derivative that together produce a blue color. A suitable triphenylmethane dye is Elacid Acid Blue 9, marketed by Rite Industries, of High Point, N.C. This dye has a color index of acid blue 9. It is soluble in water. A suitable color brightener is Intrawite RW II, marketed by Yorkshire Americas. This is an anionic stilbene derivative this is miscible with water in all proportions.

In another preferred embodiment, the colorant is a pyrene dye that is used together with a triphenylmethane dye that produce a green color. The pyrene dye is the same as described above in the embodiment in which a yellow color is produced. The triphenylmethane dye is the same in the embodiment in which a blue color is produced. The combination results in a green color.

In another embodiment, the colorant is a rhodamine dye as described above in the embodiment that produces the pink color that is used together with a triphenylmethane dye as described in the embodiment that produces a blue or green color. The combination of these dyes results in a purple color.

In another embodiment, the colorant is a xanthene dye and a coumarin dye that together produce an orange color. A suitable xanthene dye is Basonyl Red 485, marketed by BASF. This is a xanthene dye that whose color index is Basic Red 1:1. It is a cationic dye that is readily soluble in alcohols, glycol ethers, and water. A suitable coumarin dye is a yellow dye marketed as Fluorescent Yellow AA 216 by Keystone Aniline Corporation, Chicago. This is a coumarin dye that is relatively soluble in water.

Other dyes can be used. The selection and use of suitable fluorescent dyes are well known to one of ordinary skill in the art and need not be described further here.

Other ingredients can be used.

A preferred composition according to the present invention comprises:

(1) from about 20% to about 50% of water;
(2) from about 20% to about 50% of diethylene glycol;
(3) optionally, from about 0.1% to about 15% of ethylene glycol;
(4) optionally, from about 0.1% to about 15 of propylene glycol;
(5) from about 0.1% to about 20% of 2-pyrrolidone;
(6) optionally, from about 0.1% to about 15% of triethanolamine;
(7) optionally, from about 0.1% to about 10.0% of a resin that is a styrenated acrylic polymer that has a weight-average molecular weight of about 8500;
(8) from about 0.1% to about 5% of colorant to yield a detectable fluorescent color when the ink composition is applied to paper;
(9) from about 0.1% to about 2% of a mixture of 5-chloro-2-methyl-4-isothiazolin-3-one and 2-methyl-4-isothiazolin-3-one;
(10) optionally, from about 0.1% to about 5.0% of potassium carbonate; and
(11) from about 0.1% to about 2% of 2,4,7,9-tetramethyl-5-decyne-4,7-diol.

A particularly preferred composition according to the present invention comprises:

(1) from about 20% to about 40% of water;
(2) from about 20% to about 40% of diethylene glycol;
(3) from about 7% to about 12% of ethylene glycol;
(4) optionally, from about 7% to about 12% of propylene glycol;
(5) from about 5% to about 15% of 2-pyrrolidone;
(6) optionally, from about 5% to about 12% of triethanolamine;
(7) optionally, from about 2% to about 7% of a resin that is a styrenated acrylic polymer that has a weight-average molecular weight of about 8500;
(8) optionally, about 2% to about 5% of potassium carbonate;
(9) from about 0.1% to about 3% of colorant;
(10) from about 0.1% to about 1% of a mixture of 5-chloro-2-methyl-4-isothiazolin-3-one and 2-methyl-4-isothiazolin-3-one; and

(11) from about 0.1% to about 1% of 2,4,7,9-tetramethyl-5-decyne-4,7-diol.

The dyes or combinations of dyes recited above to produce a fluorescent yellow color, a fluorescent pink color, a fluorescent blue color, a fluorescent green color, a fluorescent purple color, or a fluorescent orange color can be used. Alternatively, other dyes or other combinations of dyes can be used to produce other colors. The use of such dyes to produce fluorescent colors detectable on paper is well known in the art.

One particularly preferred embodiment is a smear-resistant ink composition comprising:

(1) from about 28.80% to about 35.20% of water;
(2) from about 34.20% to about 41.80% of diethylene glycol;
(3) from about 7.20% to about 8.80% of triethanolamine;
(4) from about 9.00% to about 11.00% of ethylene glycol;
(5) from about 9.00% to about 11.00% of 2-pyrrolidone;
(6) from about 1.62% to about 1.98% of a pyrene dye that produces a detectable fluorescent yellow color when the ink composition is applied to paper;
(7) from about 0.09% to about 0.11% of a mixture of 5-chloro-2-methyl-4-isothiazolin-3-one and 2-methyl-4-isothiazolin-3-one; and
(8) from about 0.09% to about 0.11% of 2,4,7,9-tetramethyl-5-decyne-4,7-diol.

Preferably, this composition comprises:

(1) about 32.00% of water;
(2) about 38.00% of diethylene glycol;
(3) about 8.00% of triethanolamine;
(4) about 10.00% of ethylene glycol;
(5) about 10.00% of 2-pyrrolidone;
(6f) about 1.80% of a pyrene dye that produces a detectable fluorescent yellow color when the ink composition is applied to paper;
(7) about 0.10% of a mixture of 5-chloro-2-methyl-4-isothiazolin-3-one and 2-methyl-4-isothiazolin-3-one; and
(8) about 0.10% of 2,4,7,9-tetramethyl-5-decyne-4,7-diol.

In another preferred embodiment, the composition is a smear-resistant ink composition comprising:

(1) about 34.20% to about 41.80% of water;
(2) about 22.14% to about 27.06% of diethylene glycol;
(3) about 9.00% to about 11.00% of ethylene glycol;
(4) about 9.00% to about 11.00% of propylene glycol;
(5) about 9.00% to about 11.00% of 2-pyrrolidone;
(6) about 0.09% to about 0.11% of a mixture of 5-chloro-2-methyl-4-isothiazolin-3-one and 2-methyl-4-isothiazolin-3-one;
(7) about 3.15% to about 3.85% of a resin that is a styrenated acrylic polymer that has a weight-average molecular weight of about 8500;
(8) about 3.15% to about 3.85% of potassium carbonate;
(9) about 0.18% to about 0.22% of a rhodamine dye that produces a detectable fluorescent pink color when the ink composition is applied to paper; and
(10) about 0.09% to about 0.11% of 2,4,7,9-tetramethyl-5-decyne-4,7-diol.

More preferably, the composition comprises:

(1) about 38.00% of water;
(2) about 24.60% of diethylene glycol;
(3) about 10.00% of ethylene glycol;
(4) about 10.00% of propylene glycol;
(5) about 10.00% of 2-pyrrolidone;
(6) about 0.10% of a mixture of 5-chloro-2-methyl-4-isothiazolin-3-one;
(7) about 3.50% of a resin that is a styrenated acrylic polymer that has a weight-average molecular weight of about 8500;
(8) about 3.50% of potassium carbonate;
(9) about 0.20% of a rhodamine dye that produces a detectable fluorescent pink color when the ink composition is applied to paper; and
(10) about 0.10% of 2,4,7,9-tetramethyl-5-decyne-4,7-diol.

In another embodiment, the composition is a smear-resistant ink composition comprising:

(1) from about 31.995% to about 39.105% of water;
(2) from about 28.80% to about 35.20% of diethylene glycol;
(3) from about 9.00% to about 11.00% of ethylene glycol;
(4) from about 9.00% to about 11.00% of propylene glycol;
(5) from about 9.00% to about 11.00% of 2-pyrrolidone;
(6) from about 0.090% to about 0.110% of a mixture of 5-chloro-2-methyl-4-isothiazolin-3-one and 2-methyl-4-isothiazolin-3-one;
(7) from about 0.09% to about 0.11% of 2,4,7,9-tetramethyl-5-decyne-4,7-diol;
(8) from about 1.125% to about 1.375% of a triphenylmethane dye; and
(9) from about 0.90% to about 1.10% of a color brightener that is an anionic stilbene derivative, the triphenylmethane dye and the color brightener producing a detectable fluorescent blue color when the ink composition is applied to paper.

More preferably, the composition comprises:

(1) about 35.55% of water;
(2) about 32.00% of diethylene glycol;
(3) about 10.00% of ethylene glycol;
(4) about 10.00% of propylene glycol;
(5) about 10.00% of 2-pyrrolidone;
(6) about 0.10% of a mixture of 5-chloro-2-methyl-4-isothiazolin-3-one and 2-methyl-4-isothiazolin-3-one;
(7) about 0.10% of 2,4,7,9-tetramethyl-5-decyne-4,7-diol;
(8) about 1.25% of a triphenylmethane dye; and
(9) about 1.00% of a color brightener that is an anionic stilbene derivative, the triphenylmethane dye and the color brightener producing a detectable fluorescent blue color when the ink composition is applied to paper.

In another embodiment, the composition is a smear-resistant ink composition comprising:

(1) from about 31.50% to about 38.50% of water;
(2) from about 20.475% to about 25.025% of diethylene glycol;
(3) from about 9.00% to about 11.00% of triethanolamine;
(4) from about 9.00% to about 10.00% of ethylene glycol;
(5) from about 9.00% to about 11.00% of propylene glycol;
(6) from about 9.00% to about 11.00% of 2-pyrrolidone;
(7) from about 1.62% to about 1.98% of a pyrene dye;
(8) from about 0.09% to about 0.11% of a mixture of 5-chloro-2-methyl-4-isothiazolin-3-one and 2-methyl-4-isothiazolin-3-one;

(9) from about 0.09% to about 0.11% of 2,4,7,9-tetramethyl-5-decyne-4,7-diol; and
(10) from about 0.225% to about 0.275% of a triphenylmethane dye, the pyrene dye and the triphenylmethane dye together producing a detectable fluorescent green color when the ink composition is applied to paper.

More preferably, the composition comprises:
(1) about 35.00% of water;
(2) about 22.75% of diethylene glycol;
(3) about 10.00% of triethanolamine;
(4) about 10.00% of ethylene glycol;
(5) about 10.00% of propylene glycol;
(6) about 10.00% of 2-pyrrolidone;
(7) about 1.80% of a pyrene dye;
(8) about 0.10% of a mixture of 5-chloro-2-methyl-4-isothiazolin-3-one and 2-methyl-4-isothiazolin-3-one;
(9) about 0.10% of 2,4,7,9-tetramethyl-5-decyne-4,7-diol; and
(10) about 0.25% of a triphenylmethane dye, the pyrene dye and the triphenylmethane dye together producing a detectable fluorescent green color when the ink composition is applied to paper.

In another embodiment, the composition is a smear-resistant ink composition comprising:
(1) from about 32.022% to about 39.138% of water;
(2) from about 30.60% to about 37.40% of diethylene glycol;
(3) from about 9.00% to about 11.00% of ethylene glycol;
(4) from about 9.00% to about 11.00% of propylene glycol;
(5) from about 9.00% to about 11.00% of 2-pyrrolidone;
(6) from about 0.09% to about 0.11% of a mixture of 5-chloro-2-methyl-4-isothiazolin-3-one and 2-methyl-4-isothiazolin-3-one;
(7) from about 0.054% to about 0.066% of rhodamine dye;
(8) from about 0.09% to about 0.11% of 2,4,7,9-tetramethyl-5-decyne-4,7-diol; and
(9) from about 0.144% to about 0.176% of a triphenylmethane dye, the rhodamine dye and the triphenylmethane dye together producing a detectable fluorescent purple color when the ink composition is applied to paper.

More preferably, the composition comprises:
(1) about 35.58% of water;
(2) about 34.00% of diethylene glycol;
(3) about 10.00% of ethylene glycol;
(4) about 10.00% of propylene glycol;
(5) about 10.00% of 2-pyrrolidone;
(6) about 0.10% of a mixture of 5-chloro-2-methyl-4-isothiazolin-3-one and 2-methyl-4-isothiazolin-3-one;
(7) about 0.06% of a rhodamine dye;
(8) about 0.10% of 2,4,7,9-tetramethyl-5-decyne-4,7-diol; and
(9) about 0.16% of a triphenylmethane dye, the rhodamine dye and the triphenylmethane dye together producing a detectable fluorescent purple color when the ink composition is applied to paper.

Another preferred embodiment of the present composition is a smear-resistant ink composition comprising:
(1) from about 32.40% to about 39.60% of water;
(2) from about 29.232% to about 35.728% of diethylene glycol;
(3) from about 9.00% to about 11.00% of ethylene glycol;
(4) from about 9.00% to about 11.00% of propylene glycol;
(5) from about 9.00% to about 11.00% of 2-pyrrolidone;
(6) from about 0.09% to about 0.11% of a mixture of 5-chloro-2-methyl-4-isothiazolin-3-one and 2-methyl-4-isothiazolin-3-one;
(7) from about 0.09% to about 0.11% of 2,4,7,9-tetramethyl-5-decyne-4,7-diol;
(8) from about 0.153% to about 0.187% of xanthene dye; and
(9) from about 1.035% to about 1.265% of a coumarin dye, the xanthene dye and the coumarin dye together producing a detectable fluorescent orange color when the ink composition is applied to paper.

More preferably, the composition comprises:
(1) about 36.00% of water;
(2) about 32.48% of diethylene glycol;
(3) about 10.00% of ethylene glycol;
(4) about 10.00% of propylene glycol;
(5) about 10.00% of 2-pyrrolidone;
(6) about 0.10% of a mixture of 5-chloro-2-methyl-4-isothiazolin-3-one and 2-methyl-4-isothiazolin-3-one;
(7) about 0.10% of 2,4,7,9-tetramethyl-5-decyne-4,7-diol;
(8) about 0.17% of a xanthene dye; and
(9) about 1.15% of a coumarin dye, the xanthene dye and the coumarin dye together producing a detectable fluorescent orange color when the ink composition is applied to paper.

The invention is illustrated by the following Examples. These Examples are for illustrative purposes only and are not intended to limit the invention.

EXAMPLE 1

| Highlighter Ink With Fluorescent Yellow Color | |
|---|---|
| Ingredient | Weight % |
| Water | 32.00 |
| Diethylene Glycol | 38.00 |
| Triethanolamine | 8.00 |
| Ethylene Glycol | 10.00 |
| 2-Pyrrolidone | 10.00 |
| Pyranine | 1.80 |
| Kathon | 0.10 |
| Surfynol | 0.10 |

A highlighter ink with fluorescent yellow color is produced by mixing the ingredients in Table 1.

EXAMPLE 2

| Highlighter Ink With Fluorescent Pink Color | |
|---|---|
| Ingredient | Weight % |
| Water | 38.00 |
| Diethylene Glycol | 24.60 |
| Ethylene Glycol | 10.00 |

Highlighter Ink With Fluorescent Pink Color

| Ingredient | Weight % |
| --- | --- |
| Propylene Glycol | 10.00 |
| 2-Pyrrolidone | 10.00 |
| Kathon | 0.10 |
| Joncryl 678 | 3.50 |
| Potassium Carbonate | 3.50 |
| Rhodamine | 0.20 |
| Surfynol | 0.10 |

A highlighter ink with fluorescent pink color is produced by mixing the ingredients in Table 2.

EXAMPLE 3

Highlighter Ink With Fluorescent Blue Color

| Ingredient | Weight % |
| --- | --- |
| Water | 35.55 |
| Diethylene Glycol | 32.00 |
| Ethylene Glycol | 10.00 |
| Propylene Glycol | 10.00 |
| 2-Pyrrolidone | 10.00 |
| Kathon | 0.10 |
| Surfynol | 0.10 |
| Elacid Acid Blue 9 | 1.25 |
| Intrawite | 1.00 |

A highlighter ink with fluorescent blue color is produced by mixing the ingredients in Table 3.

EXAMPLE 4

Highlighter Ink With Fluorescent Green Color

| Ingredient | Weight % |
| --- | --- |
| Water | 35.00 |
| Diethylene Glycol | 22.75 |
| Triethanolamine | 10.00 |
| Ethylene Glycol | 10.00 |
| Propylene Glycol | 10.00 |
| 2-Pyrrolidone | 10.00 |
| Pyranine | 1.80 |
| Kathon | 0.10 |
| Surfynol | 0.10 |
| Elacid Acid Blue 9 | 0.25 |

A highlighter ink with fluorescent green color is produced by mixing the ingredients in Table 4.

EXAMPLE 5

Highlighter Ink With Fluorescent Purple Color

| Ingredient | Weight % |
| --- | --- |
| Water | 35.58 |
| Diethylene Glycol | 34.00 |
| Ethylene Glycol | 10.00 |
| Propylene Glycol | 10.00 |
| 2-Pyrrolidone | 10.00 |
| Kathon | 0.10 |
| Rhodamine | 0.06 |
| Surfynol | 0.10 |
| Elacid Violet 4BS | 0.16 |

A highlighter ink with fluorescent purple color is produced by mixing the ingredients in Table 5.

EXAMPLE 6

Highlighter Ink With Fluorescent Orange Color

| Ingredient | Weight % |
| --- | --- |
| Water | 36.00 |
| Diethylene Glycol | 32.48 |
| Ethylene Glycol | 10.00 |
| Propylene Glycol | 10.00 |
| 2-Pyrrolidone | 10.00 |
| Kathon | 0.10 |
| Surfynol | 0.10 |
| Basonyl Red 485 | 0.17 |
| Fluorescent Yellow AA 216 | 1.15 |

A highlighter ink with fluorescent orange color is produced by mixing the ingredients in Table 6.

ADVANTAGES OF THE INVENTION

Ink compositions according to the present invention can be used to highlight ink-jet printed documents without smearing. A maximum of 2–3 swipes can be achieved without damaging the documents. Ink compositions according to the present invention will enable consumers to highlight any documents regardless of how they were printed, whether on ink-jet printers, laser printers, or copiers. Thus, such compositions can be used readily by consumers and businesses and will preserve the legibility of documents.

We claim:

1. A smear-resistant ink composition comprising:
    (a) water;
    (b) at least one glycol selected from the group consisting of diethylene glycol, ethylene glycol, glycerol, and propylene glycol;
    (c) a pyrrolidone selected from the group consisting of 2-pyrrolidone and 3-pyrrolidone; and
    at least one colorant to yield a detectable fluorescent color when the ink composition is applied to paper,
    a biocide;
    a nonionic surfactant;
    optionally, a basic color stabilizer selected from a group consisting of ethanolamine, diethanolamine, and triethanolamine;
    optionally, a resin that is styrenated acrylic polymer; and
    optionally, a resin modifier that is selected from potassium carbonate and sodium carbonate,
    wherein the ink is a fluid.

2. The ink composition of claim 1 wherein the styrenated acrylic polymer is included in the ink composition and has a weight-average molecular weight of from about 5,000 to about 10,000.

3. The ink composition of claim 1 wherein the styrenated acrylic polymer is included in the ink composition and has a weight-average molecular weight of about 8500.

4. The ink composition of claim 1 wherein the biocide comprises a mixture of 5-chloro-2-methyl-4-isothiazolin-3-one and 2-methyl-4-isothiazolin-3-one.

5. The ink composition of claim 1 wherein the surfactant is a branched alkynediol.

6. The ink composition of claim 1 wherein the surfactant is 2,4,7,9-tetramethyl-5-decyne-4,7-diol.

7. The ink composition of claim 1 wherein the colorant is a pyrene dye that produces a yellow color.

8. The ink composition of claim 1 wherein the colorant is a rhodamine dye that produces a pink color.

9. The ink composition of claim 1 wherein the colorant is a triphenylmethane dye and a color brightener that is an anionic stilbene derivative that together produce a blue color.

10. The ink composition of claim 1 wherein the colorant is a pyrene dye and a triphenylmethane dye that together produce a green color.

11. The ink composition of claim 1 wherein the colorant is a rhodamine dye and a triphenylmethane dye that together produce a purple color.

12. The ink composition of claim 1 wherein the colorant is a xanthene dye and a coumarin dye that together produce an orange color.

13. A smear-resistant ink composition comprising:
   (a) from about 20% to about 50% of water;
   (b) from about 20% to about 50% of diethylene glycol;
   (c) optionally, from about 0.1% to about 15% of ethylene glycol;
   (d) optionally, from about 0.1% to about 15 of propylene glycol;
   (e) from about 0.1% to about 20% of 2-pyrrolidone;
   (f) optionally, from about 0.1% to about 15% of triethanolamine;
   (g) optionally, from about 0.1% to about 10.0% of a resin that is a styrenated acrylic polymer that has a weight-average molecular weight of about 8500;
   (h) from about 0.1% to about 5% of colorant to yield a detectable fluorescent color when the ink composition is applied to paper;
   (i) from about 0.1% to about 2% of a mixture of 5-chloro-2-methyl-4-isothiazolin-3-one and 2-methyl-4-isothiazolin-3-one;
   (j) optionally, from about 0.1% to about 5.0% of potassium carbonate; and
   (k) from about 0.1% to about 2% of 2,4,7,9-tetramethyl-5-decyne-4,7-diol.

14. The ink composition of claim 13 wherein the composition comprises:
   (a) from about 20% to about 40% of water;
   (b) from about 20% to about 40% of diethylene glycol;
   (c) from about 7% to about 12% of ethylene glycol;
   (d) optionally, from about 7% to about 12% of propylene glycol;
   (e) from about 5% to about 15% of 2-pyrrolidone;
   (f) optionally, from about 5% to about 12% of triethanolamine;
   (g) optionally, from about 2% to about 7% of a resin that is a styrenated acrylic polymer that has a weight-average molecular weight of about 8500;
   (h) optionally, about 2% to about 5% of potassium carbonate;
   (i) from about 0.1% to about 3% of colorant;
   (j) from about 0.1% to about 1% of a mixture of 5-chloro-2-methyl-4-isothiazolin-3-one and 2-methyl-4-isothiazolin-3-one; and
   (k) from about 0.1% to about 1% of 2,4,7,9-tetramethyl-5-decyne-4,7-diol.

15. The ink composition of claim 14 wherein the colorant is a pyrene dye that produces a yellow color.

16. The ink composition of claim 14 wherein the colorant is a rhodamine dye that produces a pink color.

17. The ink composition of claim 14 wherein the colorant is a triphenylmethane dye and a color brightener that is an anionic stilbene derivative that together produce a blue color.

18. The ink composition of claim 14 wherein the colorant is a pyrene dye an a triphenylmethane dye that together produce a green color.

19. The ink composition of claim 14 wherein the colorant is a rhodamine dye and a triphenylmethane dye that together produce a purple color.

20. The ink composition of claim 14 wherein the colorant is a xanthene dye and a coumarin dye that together produce an orange color.

21. A smear-resistant ink composition comprising:
   (a) from about 28.80% to about 35.20% of water;
   (b) from about 34.20% to about 41.80% of diethylene glycol;
   (c) from about 7.20% to about 8.80% of triethanolamine;
   (d) from about 9.00% to about 11.00% of ethylene glycol;
   (e) from about 9.00% to about 11.00% of 2-pyrrolidone;
   (f) from about 1.62% to about 1.98% of a pyrene dye that produces a detectable fluorescent yellow color when the ink composition is applied to paper;
   (g) from about 0.09% to about 0.11% of a mixture of 5-chloro-2-methyl-4-isothiazolin-3-one and 2-methyl-4-isothiazolin-3-one; and
   (h) from about 0.09% to about 0.11% of 2,4,7,9-tetramethyl-5-decyne-4,7-diol.

22. The ink composition of claim 21 comprising:
   (a) about 32.00% of water;
   (b) about 38.00% of diethylene glycol;
   (c) about 8.00% of triethanolamine;
   (d) about 10.00% of ethylene glycol;
   (e) about 10.00% of 2-pyrrolidone;
   (f) about 1.80% of a pyrene dye that produces a detectable fluorescent yellow color when the ink composition is applied to paper;
   (g) about 0.10% of a mixture of 5-chloro-2-methyl-4-isothiazolin-3-one and 2-methyl-4-isothiazolin-3-one; and
   (h) about 0.10% of 2,4,7,9-tetramethyl-5-decyne-4,7-diol.

23. A smear-resistant ink composition comprising:
   (a) about 34.20% to about 41.80% of water;
   (b) about 22.14% to about 27.06% of diethylene glycol;
   (c) about 9.00% to about 11.00% of ethylene glycol;
   (d) about 9.00% to about 11.00% of propylene glycol;
   (e) about 9.00% to about 11.00% of 2-pyrrolidone;
   (f) about 0.09% to about 0.11% of a mixture of 5-chloro-2-methyl-4-isothiazolin-3-one and 2-methyl4-isothiazolin-3-one;
   (g) about 3.15% to about 3.85% of a resin that is a styrenated acrylic polymer that has a weight-average molecular weight of about 8500;

(h) about 3.15% to about 3.85% of potassium carbonate;
(i) about 0.18% to about 0.22% of a rhodamine dye that produces a detectable fluorescent pink color when the ink composition is applied to paper; and
(j) about 0.09% to about 0.11% of 2,4,7,9-tetramethyl-5-decyne-4,7-diol.

24. The ink composition of claim 23 wherein the composition comprises:
(a) about 38.00% of water;
(b) about 24.60% of diethylene glycol;
(c) about 10.00% of ethylene glycol;
(d) about 10.00% of propylene glycol,
(e) about 10.00% of 2-pyrrolidone;
(f) about 0.10% of a mixture of 5-chloro-2-methyl-4-isothiazolin-3-one;
(g) about 3.50% of a resin that is a styrenated acrylic polymer that has a weight-average molecular weight of about 8,500;
(h) about 3.50% of potassium carbonate;
(i) about 0.20% of a rhodamine dye that produces a detectable fluorescent pink color when the ink composition is applied to paper; and
(j) about 0.10% of 2,4,7,9-tetramethyl-5-decyne-4,7-diol.

25. A smear-resistant ink composition comprising:
(a) from about 31.995% to about 39.105% of water;
(b) from about 28.80% to about 35.20% of diethylene glycol;
(c) from about 9.00% to about 11.00% of ethylene glycol;
(d) from about 9.00% to about 11.00% of propylene glycol;
(e) from about 9.00% to about 11.00% of 2-pyrrolidone;
(f) from about 0.090% to about 0.110% of a mixture of 5-chloro-2-methyl-4-isothiazolin-3-one and 2-methyl-4-isothiazolin-3-one;
(g) from about 0.09% to about 0.11% of 2,4,7,9-tetramethyl-5-decyne-4,7-diol;
(h) from about 1.125% to about 1.375% of a triphenylmethane dye; and
(i) from about 0.90% to about 1.10% of a color brightener that is an anionic stilbene derivative, the triphenylmethane dye and the color brightener producing a detectable fluorescent blue color when the ink composition is applied to paper.

26. The ink composition of claim 25 wherein the ink composition comprises:
(a) about 35.55% of water;
(b) about 32.00% of diethylene glycol;
(c) about 10.00% of ethylene glycol;
(d) about 10.00% of propylene glycol;
(e) about 10.00% of 2-pyrrolidone;
(f) about 0.10% of a mixture of 5-chloro-2-methyl-4-isothiazolin-3-one and 2-methyl-4-isothiazolin-3-one;
(g) about 0.10% of 2,4,7,9-tetramethyl-5-decyne-4,7-diol;
(h) about 1.25% of a triphenylmethane dye; and
(i) about 1.00% of a color brightener that is an anionic stilbene derivative, the triphenylmethane dye and the color brightener producing a detectable fluorescent blue color when the ink composition is applied to paper.

27. A smear-resistant ink composition comprising:
(a) from about 31.50% to about 38.50% of water;
(b) from about 20.475% to about 25.025% of diethylene glycol;
(c) from about 9.00% to about 11.00% of triethanolamine;
(d) from about 9.00% to about 11.00% of ethylene glycol;
(e) from about 9.00% to about 11.00% of propylene glycol;
(f) from about 9.00% to about 11.00% of 2-pyrrolidone;
(g) from about 1.62% to about 1.98% of a pyrene dye;
(h) from about 0.09% to about 0.11% of a mixture of 5-chloro-2-methyl-4-isothiazolin-3-one and 2-methyl-4-isothiazolin-3-one;
(i) from about 0.09% to about 0.11% of 2,4,7,9-tetramethyl-5-decyne-4,7-diol; and
(j) from about 0.225% to about 0.275% of a triphenylmethane dye, the pyrene dye and the triphenylmethane dye together producing a detectable fluorescent green color when the ink composition is applied to paper.

28. The ink composition of claim 27 wherein the composition comprises:
(a) about 35.00% of water;
(b) about 22.75% of diethylene glycol;
(c) about 10.00% of triethanolamine;
(d) about 10.00% of ethylene glycol;
(e) about 10.00% of propylene glycol;
(f) about 10.00% of 2-pyrrolidone;
(g) about 1.80% of a pyrene dye;
(h) about 0.10% of a mixture of 5-chloro-2-methyl-4-isothiazolin-3-one and 2-methyl-4-isothiazolin-3-one;
(i) about 0.10% of 2,4,7,9-tetramethyl-5-decyne-4,7-diol; and
(j) about 0.25% of a triphenylmethane dye, the pyrene dye and the triphenylmethane dye together producing a detectable fluorescent green color when the ink composition is applied to paper.

29. A smear-resistant ink composition comprising:
(a) from about 32.022% to about 39.138% of water;
(b) from about 30.60% to about 37.40% of diethylene glycol;
(c) from about 9.00% to about 11.00% of ethylene glycol;
(d) from about 9.00% to about 11.00% of propylene glycol;
(e) from about 9.00% to about 11.00% of 2-pyrrolidone;
(f) from about 0.09% to about 0.11% of a mixture of 5-chloro-2-methyl-4-isothiazolin-3-one and 2-methyl-4-isothiazolin-3-one;
(g) from about 0.054% to about 0.066% of rhodamine dye;
(h) from about 0.09% to about 0.11% of 2,4,7,9-tetramethyl-5-decyne-4,7-diol; and
(i) from about 0.144% to about 0.176% of a triphenylmethane dye, the rhodamine dye and the triphenylmethane dye together producing a detectable fluorescent purple color when the ink composition is applied to paper.

30. The ink composition of claim 29 wherein the composition comprises:
(a) about 35.58% of water;
(b) about 34.00% of diethylene glycol;
(c) about 10.00% of ethylene glycol;
(d) about 10.00% of propylene glycol;
(e) about 10.00% of 2-pyrrolidone;
(f) about 0.10% of a mixture of 5-chloro-2-methyl-4-isothiazolin-3-one and 2-methyl-4-isothiazolin-3-one;

(g) about 0.06% of a rhodamine dye;
(h) about 0.10% of 2,4,7,9-tetramethyl-5-decyne-4,7-diol; and
(i) about 0.16% of a triphenylmethane dye, the rhodamine dye and the triphenylmethane dye together producing a detectable fluorescent purple color when the ink composition is applied to paper.

31. A smear-resistant ink composition comprising:
(a) from about 32.40% to about 39.60% of water;
(b) from about 29.232% to about 35.728% of diethylene glycol;
(c) from about 9.00% to about 11.00% of ethylene glycol;
(d) from about 9.00% to about 11.00% of propylene glycol;
(e) from about 9.00% to about 11.00% of 2-pyrrolidone;
(f) from about 0.09% to about 0.11% of a mixture of 5-chloro-2-methyl-4-isothiazolin-3-one and 2-methyl-4-isothiazolin-3-one;
(g) from about 0.09% to about 0.11% of 2,4,7,9-tetramethyl-5-decyne-4,7-diol;
(h) from about 0.153% to about 0.187% of xanthene dye; and
(i) from about 1.035% to about 1.265% of a coumarin dye, the xanthene dye and the coumarin dye together producing a detectable fluorescent orange color when the ink composition is applied to paper.

32. The ink composition of claim 31 wherein the composition comprises:
(a) about 36.00% of water;
(b) about 32.48% of diethylene glycol;
(c) about 10.00% of ethylene glycol;
(d) about 10.00% of propylene glycol;
(e) about 10.00% of 2-pyrrolidone;
(f) about 0.10% of a mixture of 5-chloro-2-methyl-4-isothiazolin-3-one and 2-methyl-4-isothiazolin-3-one;
(g) about 0.10% of 2,4,7,9-tetramethyl-5-decyne-4,7-diol;
(h) about 0.17% of a xanthene dye; and
(i) about 1.15% of a coumarin dye, the xanthene dye and the coumarin dye together producing a detectable fluorescent orange color when the ink composition is applied to paper.

* * * * *